United States Patent [19]

Graves

[11] Patent Number: 4,665,262

[45] Date of Patent: May 12, 1987

[54] POLYMERIZATION CATALYST

[75] Inventor: Victoria Graves, Crosby, Tex.

[73] Assignee: Exxon Research & Engineering Co., Florham Park, N.J.

[21] Appl. No.: 788,906

[22] Filed: Oct. 18, 1985

Related U.S. Application Data

[62] Division of Ser. No. 647,323, Sep. 4, 1984, Pat. No. 4,578,373.

[51] Int. Cl.$^4$ ................................................ C07C 2/30
[52] U.S. Cl. .................................. 585/512; 526/114; 585/522; 585/524
[58] Field of Search ............... 585/512, 522, 523, 524; 526/114; 502/113, 104, 128

[56] References Cited

U.S. PATENT DOCUMENTS

| | | | |
|---|---|---|---|
| 3,072,630 | 1/1963 | de Jong et al. | 502/128 |
| 3,094,568 | 6/1963 | Hay et al. | 502/128 |
| 4,210,559 | 7/1980 | Melquist et al. | 502/113 |
| 4,324,691 | 4/1982 | Hartsborn et al. | 526/114 |
| 4,325,835 | 4/1982 | Hartsborn et al. | 526/114 |
| 4,385,161 | 5/1983 | Count et al. | 526/114 |
| 4,396,533 | 8/1983 | Johnstone | 526/114 |
| 4,471,066 | 9/1984 | Sakurai et al. | 502/113 |
| 4,554,265 | 11/1985 | Graves | 502/113 |
| 4,578,373 | 3/1986 | Graves | 502/113 |

*Primary Examiner*—Asok Pal
*Attorney, Agent, or Firm*—M. B. Kurtzman

[57] ABSTRACT

An olefin polymerization catalyst system comprising (I) a polymerization catalyst produced by treating an inert support material, preferably a hydrated high surface area silica support having 1.00 to 1.50 hydroxyls per gram of silica with the reaction product of an organomagnesium compound and first a zirconium compound and/or a hafnium compound then a halogenator and tetravalent titanium compound, (II) an organoaluminum compound cocatalyst and (III) a chlorinated hydrocarbon promoter which produces polymers having broad molecular weight distribution in high yields.

7 Claims, No Drawings

POLYMERIZATION CATALYST

This is a division of application Ser. No. 647,323 filed 9/4/84 now U.S. Pat. No. 4,578,313.

BACKGROUND OF THE INVENTION

1. Field of the Invention

The present invention relates to a highly active catalyst system for use in the polymerization and copolymerization of alpha-olefins such as ethylene and to the process of polymerizing alpha-olefins using the catalyst system.

2. Related Art

It is well known that the alpha-olefins such as ethylene can be polymerized by contacting them under polymerization conditions with "Ziegler" type catalyst, i.e., a catalyst obtained by activating a Group 4b or 5b transition metal-containing catalyst component with a cocatalyst, e.g., a titanium compound activated with an organometallic compound. It is also well known that this type of catalyst produces polymer with a narrow molecular weight distribution. For many applications it is necessary and desirable to improve the toughness of the processed polymer. One method of improving toughness properties is by preparing polymers of high molecular weight (low melt index). However, at the higher molecular weights there is a corresponding and detrimental decrease in the rheological properties of the polymer. This is compensated for in practice by broadening the molecular weight distribution, which is typically obtained by using a chromium based catalyst system in place of the Ziegler type catalyst. However, in commercial operations where both types of polymer, i.e., broad and narrow molecular weight distribution, are produced the presence of both Ti based Ziegler type catalysts and chromium based catalysts are required, and operational problems may occur since each catalyst is a poison to the other. Hence it is highly desirable that "Ziegler" compatible catalyst suitable for producing broad molecular weight polymer be developed. It has been found by the present inventor that titanium based catalyst components for Ziegler type catalyst which contain zirconium or hafnium in addition to titanium and which are prepared by a particular procedure, provide a broader molecular weight distribution for polymer produced therewith and are fully compatible with other Ziegler type catalysts. Although the activity of these Zr/Hf modified titanium based catalysts is good, it is always desirable that greater activity be obtained.

The use of promoters, as a third catalyst component in alpha-olefin polymerizations, particularly chlorinated hydrocarbons or interhalogens, is well known to increase the activity of vanadium based Ziegler catalysts. However, when these promoters have been typically used with titanium based Ziegler catalysts some depression of activity in polymerization has been observed. It has been found surprisingly that the zirconium or hafnium modified titanium based catalysts discovered by the present inventor undergo increased polymerization activity in the presence of certain chlorinated hydrocarbons.

European Patent Application No. 058,549 filed by Asaki Kasei Kogyo Kabushiki Karisha discloses a catalyst for polymerizing olefins comprising a solid catalyst component A and an organometallic component B in which the component A is obtained by reacting an (1) organometallic compound and (2) a transition metal compound or mixture of compounds of Ti, V, Ti and V, and Ti and Zn in the presence of a (3) solid reaction product of (a) an organomagnesium compound and (b) a halide of B, Si, Ge, Sn, P, Sb, Bi, Zn or hydrogen chloride and optionally (c) a solid inorganic oxide. This reference also illustrates the depressing effect that chlorinated hydrocarbons have on titanium/zirconium Ziegler catalysts, which are different from those of the present invention, in examples 66, 67 and 68. Other references, discussed below, disclose various modified titanium Ziegler catalyst, however, these references do not teach any attempt to use halogenated hydrocarbon promoters in the polymerizations.

U.S. Pat. No. 4,325,835 to Hartshorn et al. discloses a component for an olefin polymerization catalyst which is the product of treating a particular support material with (a) an organomagnesium compound, (b) an aluminum compound e.g. ethyl aluminum dichloride, (c) an organometallic compound of general formula $R_mMX_p$ wherein M is a metal of Groups IA, IIA, IIB, IIIB, VA or VIA of a Periodic Table, R is a hydrocarbyl or substituted hydrocarbyl group, X is a singly charged anionic ligand or a monodentate neutral ligand, m is an integer up to the highest valency of the metal M and p is 0 or an integer up to 2 less than the valency of the metal M, e.g., zirconium tetrabenzyl, and (d) at least one transition metal compound of Groups IVA, VA or VIA, e.g., titanium tetrachloride.

U.S. Pat. No. 4,385,161 to Caunt et al. discloses a catalyst component for polymerization of olefin monomers which is a transition metal composition which is obtained by reacting together an inert particulate material, an organic magnesium compound, a halogen-containing compound such as carbon tetrachloride, silicon tetrachloride or boron trichloride and a specified transition metal compound such as $VOCl_3$, bis(n-butoxy) titanium dichloride or zirconium tetrabenzyl.

U.S. Pat. No. 4,396,533 to Johnstone discloses a supported Ziegler catalyst prepared by the following steps:

(A) heating together at a temperature in the range of 250° to 1100° C. a refractory oxide support material, such as silica, and one or more halogen-free metal derivatives which are hydrides and/or organic derivatives of the metal, such as titanium tetraisopropylate;

(B) reacting the product from (A) with one or more organometallic compounds having a general formula $MR^1{}_aQ_{b-a}$ wherein M is a metal atom, $R^1$ is a hydrocarbon group, Q is a halogen or an oxyhydrocarbyl group, b is a valency of M and a is an integer from 1 to b and wherein the metal atom M is aluminum, boron, lithium, zinc or magnesium such as triethyl aluminum; and (C) impregnating the solid product from step (B) with one or more halogen-containing transition metal compounds wherein the metal or metals comprise titanium and/or vanadium and/or zirconium such as a mixture of vanadium oxytrichloride and titanium tetrachloride.

U.S. Pat. No. 4,397,762 to Johnstone discloses a supported Ziegler catalyst prepared by the following steps, carried out under anhydrous conditions:

(A) reacting a hydroxyl groups-containing support material comprising magnesium silicate or silica and magnesia with one or more organometallic compounds having the general formula $MR^1{}_aQ_{b-a}$ wherein M is a metal which is aluminum, boron, lithium, zinc or magnesium, $R^1$ is a hydrocarbyl group, Q is a halogen or an oxyhydrocarbyl group, b is the valency of M and a is an integer from 1 to b;

(B) removing unreacted organometallic compound if any, from the produced solid material; and (C) impregnating the solid material obtained from step B with one or more halogen-containing transition metal compounds wherein the transition metal(s) comprise titanium, vanadium or zirconium.

Other references, e.g., U.S. Pat. No.'s 4,310,648, 4,356,111 and 4,399,053 issued to Shipley, et al. and U.S. Pat. No. 4,396,747 to Welch et al. disclose unsupported organomagnesium/Zn/Ti olefin polymerization catalyst, unlike the bimetallic Ziegler component of the present catalyst system which requires the use of a support material which can be a Group 2a, 3a, 4a or 4b metal oxides such as, for example, dehydrated silica as a support.

It is an advantage of the present invention that a rather specific titanium based catalyst modified with zirconium or hafnium prepared from a limited class of components by a particular procedure comprises a component of a catalyst system, which includes a group of chlorinated hydrocarbons as promoters in the Ziegler polymerization of alpha-olefins to produce broad molecular weight linear polymers. It is a particular advantage that the specific promoters of the present invention have no detrimental effect on these otherwise new Ti/Zr/Hf catalysts, that is, the broadened molecular weight distribution obtained with these catalysts is not eliminated. However, the activity of these catalysts (as determined by productivity) has been substantially increased when combined with the present modifiers to form the present catalyst system. In particular, the present titanium based Ziegler catalyst component differs, among other reasons, from that of U.S. Pat. No. 4,325,835 in that that patent requires at least one aluminum compound; from U.S. Pat. No. 4,385,166, U.S. Pat. No. 4,396,533 and U.S. Pat. No. 4,397,762, in that a very wide and diverse variety of support materials and reactive components are taught by the references, which in the specifics produce substantially different catalysts from the present invention; from EPA No. 0058549 in that the reference discloses that a solid organomagnesium compound is present prior to the introduction of zirconium compound, and the use of an organometallic compound (1) of lithium, magnesium, aluminum or zinc as an additional catalyst component, whereas in the present titanium catalyst component preparation the zirconium or hafnium compound reacts directly with the organomagnesium compound and the organometallic compound is not used. A particular advantage of the present catalyst system is that it allows a higher productivity of linear alpha-olefin polymer of broad molecular weight distribution.

The unsupported catalysts are less active than the present catalyst and polymers produced with such catalyst generally require deashing of the polymer to remove excess metals.

SUMMARY OF THE INVENTION

Briefly, one aspect of the present invention is a catalyst system for polymerizing at least one alpha-olefin under conditions characteristic of Ziegler polymerization comprising:

I. a supported polymerization catalyst or mixture of polymerization catalysts prepared under anhydrous conditions by the steps of:

(a) preparing a slurry of inert particulate porous support material. Preferable support material is a Group 2a, 3a, 4a or 4b metal oxide and more preferably dehydrated high surface area silica preferably having from 1.00 to 1.50 millimoles OH$^-$/gram of silica;

(b) adding to said slurry a solution of an organomagnesium compound;

(c) adding to said slurry and reacting a solution of zirconium compound, hafnium compound or mixtures thereof;

(d) adding to said slurry and reacting a halogenator;

(e) adding to said slurry and reacting a tetravalent titanium compound; and (f) recovering solid catalyst component;

II. an organoaluminum compound; and

III. a promoter of chlorinated hydrocarbons having one to 20 carbon atoms.

The resulting catalyst system is maintained under anhydrous conditions and is used to polymerize alpha-olefins to produce low melt index polymers having a broad molecular weight distribution which is determined empirically from a ratio of melt index taken under two sets of conditions, i.e., HLMI/MI=MIR. Greater MIR's indicate a broad molecular weight distribution, although for different catalysts the MIR numbers do not indicate the same molecular weight distribution.

DETAILED DESCRIPTION OF THE INVENTION

Typically, the support can be any of the solid particulate porous supports such as silica, talc, zirconia, thoria, magnesia and titania. Preferably the support material is a Group 2a, 3a, 4a and 4b metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuous or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed.

Suitable dehydrated silica preferably has a surface area of at least 20 m$^2$/g, preferably at least about 100 m$^2$/g and particle diameter of about 0.01 to 500 microns, preferably about 0.1 to 100 microns. The silica may be obtained by dehydrating silica gel by fluidizing in a stream of dry nitrogen for a period of about twenty hours at temperature sufficient to remove both adsorbed and chemically bound water, provided the resultant silica contains not less than 1.20 millimoles of OH$^-$/g of silica and preferably from 1.20 to 1.50 millimoles of OH$^-$/g of silica. It has been found that the benefit of broad molecular weight distribution are not obtained outside of this range. Generally the dehydrating temperature would be from 200° C. to 900° C., preferably about 300° C. to 500° C., most preferably 450° C.

The organomagnesium compound include hydrocarbon soluble dihydrocarbylmagnesium wherein the hydrocarbyls have from 1 to 30 carbon atoms, such as dialkyl, diaryl, dialkaryl, diaralkyl, said alkyl including cyclic and acyclic radicals, preferably the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein each alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides, and aryl and alkyl magnesium halides with the halogen-free organomagnesium compounds being more desirable.

The zirconium and hafnium compounds includes halides, alkoxyhalides, alkoxides and chelate compounds. Suitable zirconium and hafnium compounds which can be employed herein include those represented by the empirical formula: $M(OR)_xX_y$, wherein M is Zr or Hf, each R is independently a hydrocarbyl group having from 1 to 20, preferably 1 to about 10, carbon atoms, each X is independently a halogen atom, preferably chlorine or bromine, and x and y independently have values from zero to 4 with the value of x plus y being 4, such as zirconium tetrachloride, zirconium tetrabromide, ethoxytrichlorozirconium, diethoxydichlorozirconium, dibutoxydichlorozirconium, ethoxytrichlorozirconium, butoxytrichlorozirconium, tetraethoxyzirconium, tetrabutoxyzirconium, zirconium acetylacetonate, di(2-ethyl hexoxy) dichlorozirconium hafnium tetrachloride, hafnium tetrabromide, ethoxytrichlorohafnium, diethoxydichlorohafnium, dibutoxydichlorohafnium, ethoxytrichlorohafnium, butoxytrichlorohafnium, tetraethoxyhafnium, tetrabutoxyhafnium, hafnium acetylacetonate, di(2-ethyl hexoxy) dichlorohafnium and any mixture thereof.

The halogenators include the chlorides, bromides and fluorides of Group 3a, 4a and 5a metals of the Periodic Table of elements (U.S. standard Periodic Table as shown on the back cover of Handbook of Chemistry and Physics, 45th Edition, The Chemical Rubber Co., 1964) more preferably B, Si, Ge, Sn. P, Sb and Bi and hydrogen halides such as HCl, HBr and HF.

The halides are the compounds having at least one halogen atom. Preferred halides are the chlorides. Exemplary halides include boron halides such as boron trichloride, diethylboron chloride, dibutylboron chloride, diphenylboron chloride, ethylboron dichloride, butylboron dichloride, phenylboron dichloride, ethoxyboron dichloride and boron tribromide; silicon halides such as methylchlorosilane, methyldichlorosilane, tetrachlorosilane, trichlorosilane, methyltrichlorosilane, dimethylchlorosilane, dimethyldichlorosilane, trimethylchlorosilane, ethyldichlorosilane, ethyltrichlorosilane, diethylchlorosilane, diethyldichlorosilane, triethylchlorosilane, vinyltrichlorosilane, vinyldichlorosilane, propyltrichlorosilane, propyldichlorosilane, allyltrichlorosilane, butyltrichlorosilane, butyldichlorosilane, isobutyltrichlorosilane, sec-butyltrichlorosilane, tert-butyltrichlorosilane, sym-tetramethyldichlorosilane, octyldichlorosilane, decyltrichlorosilane, decyldichlorosilane, pentachlorodisilmethylene, hexachlorodisilmethylene, hexachlorocyclotrisilmethylene, phenyltrichlorosilane, phenyldichlorosilane, benzyltrichlorosilane, ethoxytrichlorosilane, diethoxydichlorosilane, butoxydichlorosilane, octoxytrichlorosilane and tetrabromosilane; germanium halides such as tetrachlorogermanium, methyltrichlorogermanium, dimethyldichlorogermanium, trimethylchlorogermanium, ethyltrichlorogermanium, butyltrichlorogermanium and ethoxytrichlorogermanium; tin halides such as tin tetrachloride, methyltrichlorotin, diethyldichlorotin, dibutoxydibutyltin, trioctylchlorotin and tin tetrabromide; phosphorus halides such as phosphorus trichloride, phosphorus tribromide, phosphorus pentachloride, ethyldichlorophosphine and propyldichlorophosphine; antimony halides such as methyldichlorostibine, trimethylantimony dichloride and tripropylantimony dichloride and bismuth halides such as methyldichlorobismuthine; ethyldichlorobismuthine, butyldichlorobismuthine and dimethylchlorobismuthine. Of these compounds, chlorides of boron, tin, silicon or germanium are preferred in order to obtain polymers having a good particle size distribution and a high bulk density, and chlorides of boron are more preferred.

The tetravalent titanium compounds employed in this invention include halides, alkoxyhalides. alkoxides, siloxyhalides, siloxides, aromatic ring complexes and chelate compounds of titanium such as titanium tetrachloride, titanium tetrabromide, titanium tetraiodide, ethoxytitanium trichloride, propoxytitanium trichloride, butoxytitanium trichloride, octoxytitanium trichloride, diethoxytitanium dichloride, dipropoxytitanium dichloride, dibutoxytitanium dichloride, triethoxytitanium monochloride, tripropoxytitanium monochloride, tributoxytitanium monochloride, phenoxytitanium trichloride, benzoyltitanium trichloride, dicyclopentadienyltitanium dichloride, tetraisopropoxytitanium, tetrapropoxytitanium, tetrabutoxytitanium, bis(triphenylsiloxy)titanium dichloride, titanium acetylacetonate and any mixtures thereof.

Generally the silica or other support comprises from 44 to 84 weight percent of the total polymerization catalyst component, preferably about 48 to 54 weight percent.

The proportions of the foregoing components of the catalyst are such that the atomic ratios of the elements are:

Mg:M' is from about 1:1 to about 14:1; preferably from about 4:1 to 12:1; more preferably 6:1 to 9:1.

M':Ti is from about 0.1:1 to about 10:1; preferably from about 0.3:1 to 5:1; more preferably 0.4:3 to 3:1, where M' is Zr, Hf or a mixture of Zr and Hf.

The reaction to produce the polymerization catalyst(s) is carried out in the presence of an inert diluent. The concentrations of catalyst components are preferably such that when the essential components are combined, the resultant slurry is from about 0.0005 to about 1.0 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to 200° C. Also included as suitable inert diluents are benzene, toluene, ethylbenzene, cumene, decalin and the like.

Mixing of the ingredients to provide the polymerization catalyst component(s) for use in the present catalyst system is carried out under an inert atmosphere such as nitrogen, argon or other inert gas at temperatures in the range from about 100° to about 200° C., preferably from about 0° to about 100° C. The period of mixing is not considered to be critical as it is found that a sufficient polymerization catalyst component most often occurs within about 1 minute or less. In the preparation of the polymerization catalyst component, the catalysts should be washed to remove hydrocarbon soluble components from hydrocarbon insoluble components of the reaction product.

Preferred organoaluminum compounds have the empirical formula $AlR_{3-a}X_a$ wherein each R is independently hydrocarbyl as hereinbefore defined such as alkyl, X is a halogen and a is a number from 0 to 3. Suitable organoaluminum compound include trialkylaluminums such as $Al(C_2H_5)_3$, $Al(C_3H_4)_3$, $Al(C_4H_9)_3$, $Al(C_5H_{11})_3$, $Al(C_6H_{13})_3$, $Al(C_8H_{17})_3$ and $Al(C_{10}H_{21})_3$; alkylaluminum hydrides such as $Al(C_2H_5)_2H$ and $Al(i-C_4H_9)_2H$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$. The atomic ratio of Al:Ti may be in the range of 0.1:1 to 200:1, generally less than 50:1.

The chlorine containing hydrocarbon promoter may be a single compound or mixture of such compounds, both acyclic and cyclic, having one to 20 carbon atom, preferably 1 to 12 carbon atoms, and include, for example dichloromethane (methylene chloride), 1,2-dichloroethane (ethylene chloride), 1,2-dichloropropane, 2-chlorobutane, 1,2,3,4-tetrachlorobutane, chlorocyclohexane, the freons, e.g., dichloro-difluoro-methane, 1,1-dichloro-1,2,2,2-tetrafluoro-ethane, and the like. The promoter is generally employed on the basis of 5 to 100 mmoles per gram of polymerization catalyst, preferably about 8 to 15 mmoles of promoter per gram of polymerization catalyst. More preferred promoters are chlorine containing paraffins having 1 to 3 carbon atoms, and particularly those containing at least two chlorine atoms per molecule. Dichloromethane and 1,2-dichloroethane are particularly preferred promoters.

In a second aspect, the invention is a process for polymerizing at least one alpha-olefin under conditions characteristic of Ziegler polymerization wherein the catalyst system of the present invention is employed.

In the polymerization process employing the present catalyst system, polymerization is effected by adding a catalytic amount of the above catalyst composition, organoaluminum compound and promoter (catalyst system) to a polymerization zone containing alpha-olefin monomer, or vice versa. Although the addition of catalyst, cocatalyst and promoter to the reactor can be in any order, in order to realize the greatest benefits of the invention it is highly desirable that the promoter be added to the reactor between the cocatalyst addition and the catalyst addition. The polymerization zone is maintained at temperatures in the range from about 0° to about 300° C., preferably at slurry polymerization temperatures, e.g., from about 75° to about 110° C., (solution polymerization 130° to 250° C.) for a residence time of about a few seconds to several days, preferably 15 seconds to 2 hours. It is generally desirable to carry out the polymerization in the absence of moisture and oxygen with a catalytic amount of the present polymerization catalyst component being within the range from about 0.0001 to about 0.1 millimoles titanium per liter of diluent. It is understood, however, that the most advantageous catalyst concentration will depend upon polymerization conditions such as temperature, pressure, diluent and presence of catalyst poisons, and that the foregoing range is given to obtain maximum catalyst yields in weight of polymer per unit weight of titanium. Generally the diluent is selected from paraffins and cycloparaffins having 3–30 carbon atoms. Suitable diluents include for example isobutane, isopentane, hexane, cyclohexane and the like.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization system to obtain better temperature control and to maintain uniform polymerization mixtures throughout the polymerization zone.

In order to optimize catalyst yields in the slurry polymerization of ethylene, it is preferable to maintain the total pressure in the range of 100 to 200 psig. To achieve this ethylene is fed on demand.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The catalyst system of this invention is especially useful in gas phase polymerizations in which a fluidization process is employed.

The monomer or mixture of monomers is contacted with the catalyst system in any conventional manner, preferably by bringing the present catalyst system and monomer together with intimate agitation provided by suitable stirring or other means. Agitation can be continued during polymerization, or in some instances, the polymerization mixture can be allowed to remain unstirred while the polymerization takes place. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The catalysts of this invention are useful for the polymerization of olefins and particularly useful for the polymerization of ethylene and higher alpha olefins (e.g., $C_3$–$C_8$). The advantages of this invention are especially obtained in the polymerization of ethylene to high density polyethylene (density about 0.940–0.960) and the polymerization of ethylene with higher olefins ($C_3$–$C_8$) and/or diolefins to obtain linear low density polyethylenes (density about 0.918–0.958). The preferred comonomers of ethylene are propylene, butene- 1, pentene-1, 4-methyl pentene-1, hexene-1 and octene-1.

The polymer is readily recovered from the polymerization mixture by driving off unreacted monomer and/or diluent. No further removal of impurities is required. The resultant polymer is found to contain insignificant amounts of catalyst residue and to possess a relatively broad molecular weight distribution.

The invention will be more clearly understood by reference to the following examples. These examples illustrate specific embodiments of the present invention and should not be construed to limit the invention in any way.

EXAMPLES

Typical Silica Dehydration

The silica is dehydrated by fluidizing the solid particles in a stream of dry nitrogen gas in a tube placed in a vertical tube furnace. The temperature is adjusted to 150° C. inside the fluidized bed and held for three hours to remove bulk $H_2O$. The temperature is raised to about 450° C. and held for twelve hours to twenty hours. The furnace is then turned off and the silica allowed to cool while maintaining a flow of nitrogen. The number of residual hydroxyls be determined by a weighed sample of the silica gel; at 1000° C. for twenty two hours. The weight loss on ignition can be used to determine the weight (mmoles) of OH per gram of dehydrated silica.

EXAMPLE 1

POLYMERIZATION CATALYST PREPARATION

Silica gel, 2 g (dehydrated at 600°-800° C.), was slurried in heptane. Three mmoles of butylethylmagnesium (BEM) in heptane was added to the slurry and agitated for 1 hour. Then 0.15 mmoles $Zr(OR)_2Cl_2$ (R=2-ethylhexyl) in nonane was added to the slurry and agitation continued for one hour. A chlorinator (0.6 mmoles of $BCl_3$ in methylene chloride) was then added to the slurry followed by the addition of 1 mmole of $TiCl_4$ in heptane. The slurry was stirred for an additional hour, then filtered and washed to give the final catalyst.

POLYMERIZATION WITH AND WITHOUT PROMOTER

Using the catalyst described, four runs were made in a 1.6 liter stainless steel autoclave. 760 ml of hexane, 90 mmoles hydrogen, a specified cocatalyst (organoaluminum compound) and 1,2-dichloroethane (promoter) as shown in Table I and 200 mg of the polymerization catalyst component of Example 1 were added to the autoclave. The slurry was agitated using a stirrer speed of 1200 rpm and the temperature raised to 85° C. Ethylene was admitted to the reactor until a gauge pressure of 150 pounds was achieved. This pressure was maintained throughout the reaction by feeding ethylene continuously. The reaction was continued for forty minutes at which time the ethylene flow was terminated and the reactor vented to atmospheric pressure. The results of the reaction and polymer properties are reported in Table I. The Melt Index (MI) is ASTM D 1238, 2.16 grams, condition B. The High Load Melt Index (HLMI) is ASTM D 1238, 21.6 grams, condition F. The ratio of HLMI/MI (MIR) indicates the molecular weight distribution of the polymer, higher ratio indicate broad distribution. The duplicate runs made without the promoter and with the promoter clearly show the significant improvement in yield obtained with the promoter, in direct contradiction to what one would expect from the art.

EXAMPLE 2

PREPARATION OF CATALYTIC COMPONENT

Silica gel (3.0 g. Davison 952, dehydrated at 700° C.) was charged to a 125 ml Wheaton vial and slurried in 40 ml heptane. To the vial was added 5.4 mmoles butylethyl magnesium in heptane (BEM, Stauffer Chemical Co.). The slurry was agitated for 30 minutes. The vial was then charged with 1.5 mmoles of $Zr(OR)_2Cl_2$ (R=2 ethyl hexyl) in heptane. The slurry was agitated at ambient temperature for one hour. There was added to the vial 0.9 mmoles of $BCl_3$ as a methylene chloride solution and stirring continued at ambient temperature for one hour. Finally, 0.9 mmoles $TiCl_4$ was charged to the vial as a heptane solution. After heating at 75° C. for 15 minutes, the slurry was cooled to ambient and the solid removed by filtration. The solid was washed three times with hexane and dried to vacuuo.

POLYMERIZATION WITHOUT PROMOTER

To a 2 liter stirred autoclave were charged 860 ml hexane, 1.5 mmoles triisobutyl aluminum, 200 mg of the catalyst component and 200 mmoles $H_2$. The temperature of the slurry was raised to 85° C. and the total reactor pressure raised to 150 psig by the addition of ethylene. Ethylene was fed on demand during the 40 minute polymerization so as to maintain a total pressure of 150 psig. At the end of the polymerization period, the reactor was vented to atmospheric pressure and the polymer recovered and dried. The catalyst productivity was 330 g PE/g cat./hr.

POLYMERIZATION WITH 1,2-DICHLOROETHANE PROMOTER

The polymerization experiment was repeated exactly as performed previously, except that 2 mmoles of 1,2-dichloroethane in heptane was added to the autoclave immediately after the addition of the cocatalyst, triisobutyl aluminum. Catalyst productivity for the polymerization was 2300 g PE/g cat./hr. The presence of the promoter produced approximately a 600% increase in productivity.

EXAMPLES 3-9

Catalyst formulations were prepared in a similar manner to example 2, the details of the preparation being summarized in TABLE II. The corresponding polymerization data, both with and without the promoter, are collected in TABLE III. In all cases there is a significant increase in catalyst productivity when the promoter is present. Example 3 illustrates that for resins with the same MI produced both with and without promoter, the MIR is essentially identical. This clearly indicates that the major effect of the promoter is to increase the catalyst productivity and that the molecular weight distribution of the polymer is not substantially affected.

TABLE I

| Run # | mg Cat | Cocat[1] | ml Cocat | PROMOTER mmoles | mmoles H$_2$ | Yield, g | MI dg/min | HLMI dg/min | MIR |
|---|---|---|---|---|---|---|---|---|---|
| 1 | 200 | TIBAL | 3.30 | 0 | 90 | 84.88 | 0.20 | 5.80 | 29 |
| 2 | 200 | TIBAL | 6.25 | 2.0 | 90 | 223.7 | 0.30 | 15.30 | 51 |
| 3 | 200 | IPAL | 3.74 | 0 | 90 | 281.26 | 0.10 | 4.00 | 40 |
| 4 | 200 | IPAL | 3.70 | 2.0 | 90 | 332.2 | 0.13 | 5.50 | 42.3 |

[1] TIBAL = trisobutylaluminum
IPAL = trisoprenylaluminum

TABLE II

Preparation Summary For Catalysts in Examples 2-9

| EX NO. | g Silica ml soln | mmoles BEM | mmoles Transition Metal | Treatment time, min | Treatment time, °C. | mmoles BCl$_3$ | Treatment time, min |
|---|---|---|---|---|---|---|---|
| 2 | 0.075 | 5.4 | 1.5(Zr) | 60 | ambient | 0.9 | 60 |
| 3 | 0.040 | 5.4 | 1.5(Hf) | 60 | ambient | 0.9 | 15 |
| 4 | 0.075 | 2.4 | 0.6(Zr) | 15 | 85° C. | 0.9 | 15 |
| 5 | 0.075 | 2.4 | 0.6(Hf) | 60 | 85° C. | 0.9 | 60 |
| 6 | 0.075 | 2.4 | 1.5(Hf) | 15 | 85° C. | 2.4 | 60 |
| 7 | 0.075 | 2.4 | 1.5(Zr) | 60 | ambient | 2.4 | 15 |
| 8 | 0.040 | 2.4 | 1.5(Zr) | 15 | ambient | 2.4 | 60 |
| 9 | 0.040 | 2.4 | 0.6(Hf) | 15 | ambient | 0.9 | 15 |

| EX NO. | Treatment temp, °C. | mmoles TiCl$_4$ | Treatment time, min | Treatment temp. °C. | % Mg | % Zr | % Hf | % B | % Ti |
|---|---|---|---|---|---|---|---|---|---|
| 2 | ambient | 0.9 | 15 | ambient | 1.16 | 0.76 | — | 0.25 | 1.7 |
| 3 | ambient | 0.9 | 15 | 85 | 2.18 | — | 5.33 | 0.18 | 0.94 |
| 4 | ambient | 0.9 | 60 | 85 | 1.5 | 0.63 | — | 0.22 | 1.03 |
| 5 | ambient | 1.5 | 15 | ambient | 2.38 | — | 1.77 | 0.59 | 0.29 |
| 6 | ambient | 0.9 | 15 | 85 | 1.07 | — | 5.39 | 0.57 | 0.51 |
| 7 | ambient | 0.9 | 60 | 85 | 1.71 | 2.88 | — | 0.20 | 1.74 |
| 8 | ambient | 1.5 | 60 | ambient | 1.04 | 2.86 | — | 0.11 | 0.60 |
| 9 | ambient | 0.9 | 15 | ambient | 1.57 | — | 0.94 | 0.55 | 0.90 |

TABLE III

| EX NO. | Promoter | Productivity g polymer/ g cat. hr. | % Increase | MI g/10 min | HLMI g/10 min | MIR |
|---|---|---|---|---|---|---|
| 2 | No | 330 | | 0.004 | 0.43 | 123 |
| | Yes | 2300 | 596 | 0.089 | 5.30 | 59.3 |
| 3 | No | 500 | | 0.027 | 1.49 | 56.2 |
| | Yes | 930 | 86 | 0.088 | 5.62 | 63.9 |
| 4 | No | 410 | | 0.049 | 3.16 | 64.5 |
| | Yes | 800 | 95 | 0.044 | 2.91 | 66.1 |
| 5 | No | 570 | | 0.030 | 1.64 | 63.1 |
| | Yes | 1420 | 149 | 0.080 | 4.34 | 57.1 |
| 6 | No | 340 | | 0.008 | 1.24 | 165 |
| | Yes | 1390 | 308.8 | 0.080 | 6.69 | 86.9 |
| 7 | No | 670 | | 0.004 | 0.564 | 141.0 |
| | Yes | 1080 | 61.2 | 0.032 | 3.09 | 96.6 |
| 8 | No | 460 | | — | 0.45 | — |
| | Yes | 780 | 69.5 | 0.023 | 2.83 | 126 |
| 9 | No | 150 | | 0.005 | 0.55 | 116.8 |
| | Yes | 1010 | 573 | 0.017 | 1.45 | 83.8 |

The invention claimed is:

1. A process for polymerizing at least one alpha olefin under conditions characteristic of Ziegler polymerization wherein the polymerization is conducted in the presence of a catalyst system comprising:
   I. A supported catalyst prepared under anhydrous conditions by the sequential steps of:
   (a) preparing a slurry of inert particulate support material;
   (b) adding to said slurry a solution of an organomagnesium compound;
   (c) adding to said slurry and reacting a solution of a zirconium halide compound, hafnium compound or mixtures thereof;
   (d) adding to said slurry and reacting a halogenator;
   (e) adding to said slurry and reacting a tetravalent titanium halide compound;
   (f) recovering solid catalyst;
   II. an organoaluminum compound, and
   III. a promoter comprisng a chlorinated hydrocarbon having from one to 20 carbon atoms.

2. The process in accordance with claim 1 wheein the inert particulate porous support material is silica, the organomagnesium compound is is a dihydrocarbyl magnesium compound, said halogenator is a chloride, bromide or fluoride of a metal from Groups 3a, 4a or 5a of the Periodic Table of Elements or mixture thereof.

3. The process in accordance with claim 2 wherein said dihydrocarbyl magnesium compound is ethyl-n-butyl magnesium.

4. The process in accordance with claim 1 wherein said promoter is one of dichloromethane or 1,2-dichloroethane.

5. The process in accordance with claim 1, I(c) wherein a zirconium halide is present.

6. The process in accordance with claim 1, I(c) wherein a hafnium halide is present.

7. The process in accordance with claim 1, I(c) wherein a mixture of zirconium halide and hafnium halide is present.

* * * * *